Nov. 8, 1966  E. J. HUNKELER  3,283,660
GEAR GENERATING MACHINE AND INDEX MECHANISM THEREFOR
Filed June 8, 1964  4 Sheets-Sheet 1

INVENTOR.
ERNST J. HUNKELER
BY Richard W. Treverton
ATTORNEY

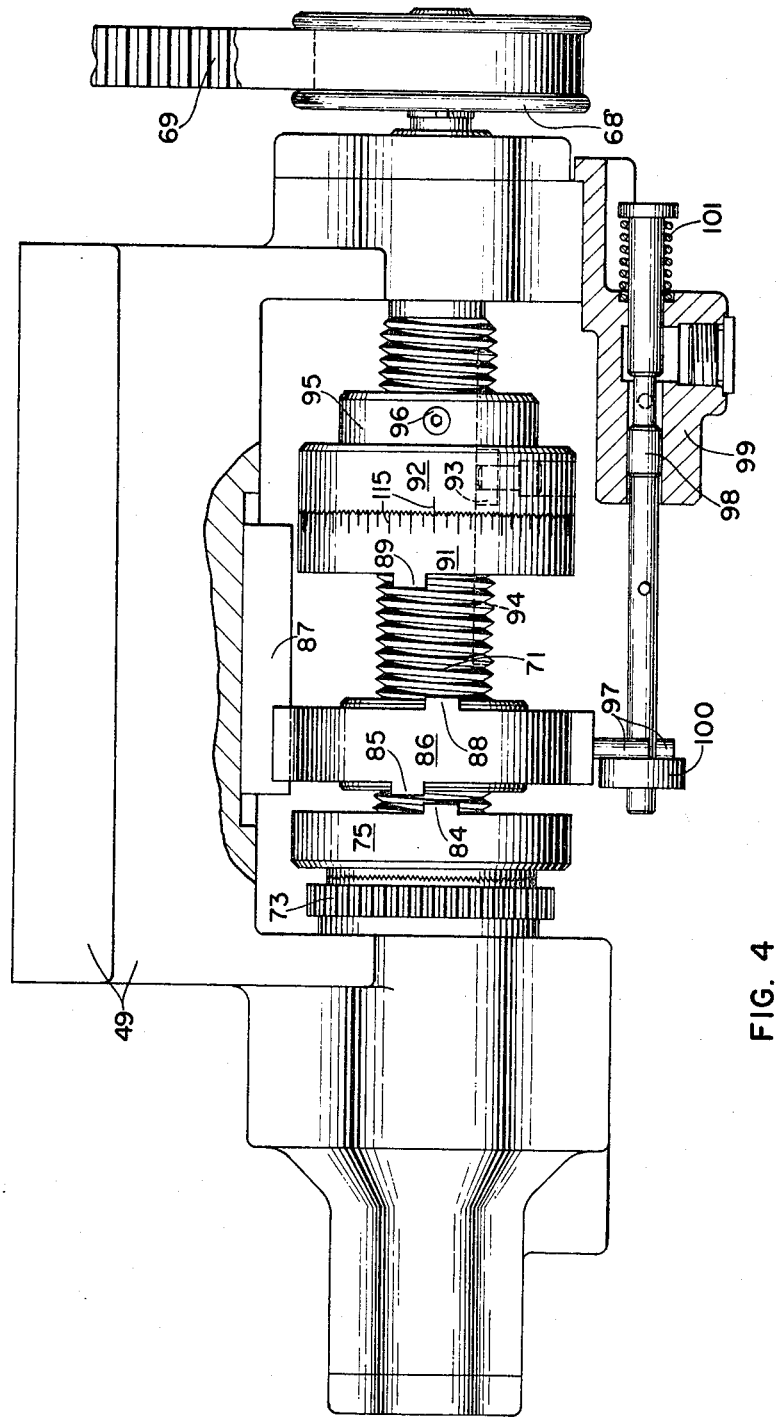

United States Patent Office 3,283,660
Patented Nov. 8, 1966

3,283,660
GEAR GENERATING MACHINE AND INDEX MECHANISM THEREFOR
Ernst J. Hunkeler, Fairport, N.Y., assignor to The Gleason Works, Rochester, N.Y., a corporation of New York
Filed June 8, 1964, Ser. No. 373,395
8 Claims. (Cl. 90—6)

The present invention relates to a gear generating machine and to an index mechanism which has especial advantage in machines of this and similar kinds.

One object of the invention is to simplify and improve the accuracy of the machine by reducing the number of gears in the train between the indexing device and the work spindle, as compared with machines having index gears in such a train, while at the same time requiring, for work gears having a given range of tooth numbers, fewer index gears or index plates than has previously been required in machines where such a gear or plate is attached directly to the work spindle of the machine.

The foregoing and other objects and advantages of the invention will appear from the following description of the typical embodiment shown in the accompanying drawings, wherein:

FIG. 4 is a side view of the parts of the mechanism shown in FIG. 3, taken at right angles to the latter view.

Figure 1:
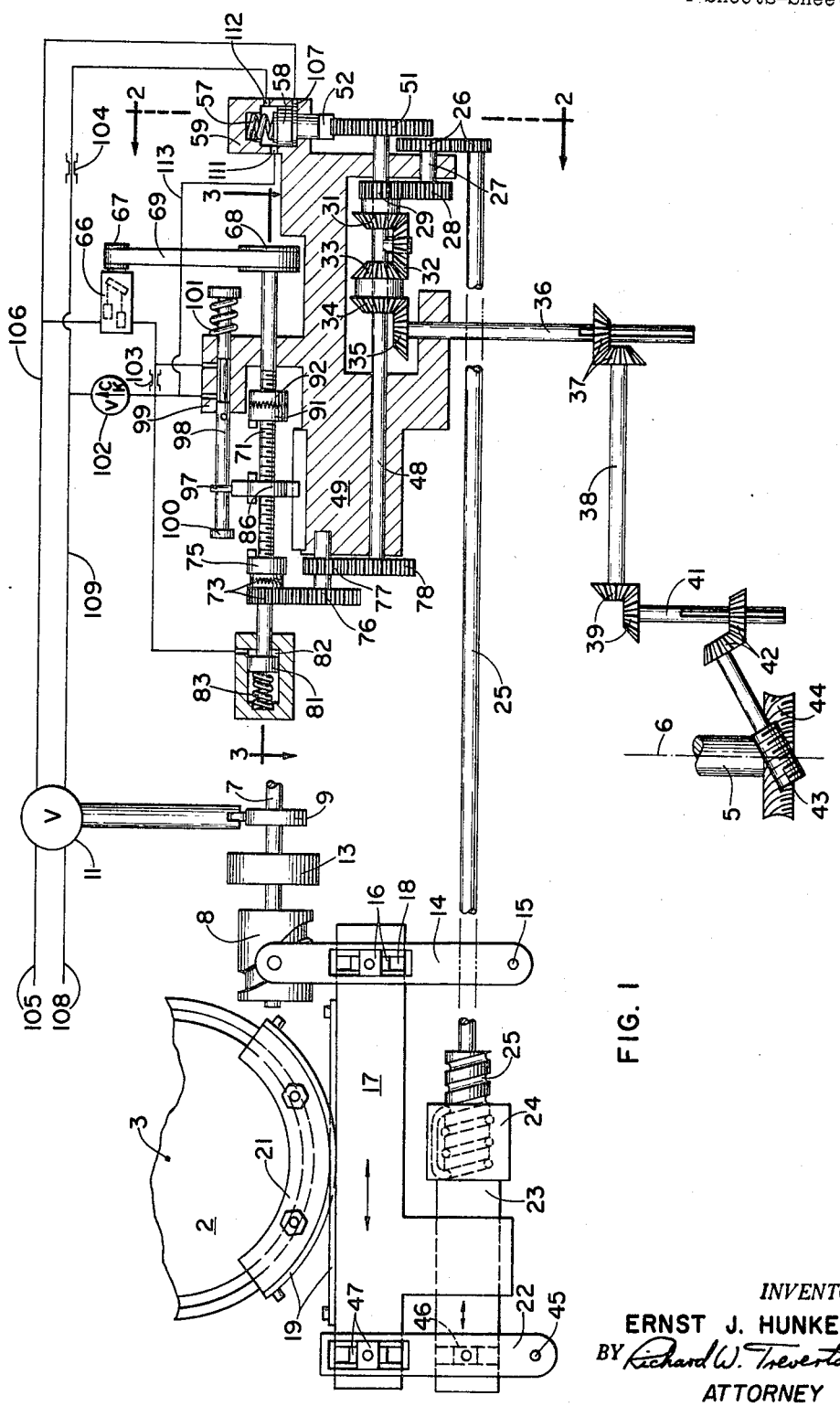
FIG. 1 is a drive diagram of a gear generating machine, including a schematic illustration of the improved index mechanism.

The drive diagrammatically shown in FIG. 1 may be employed in a gear generating machine of the general kind disclosed in my co-pending application Serial No. 354,048, filed March 23, 1964, now Patent No. 3,234,852 issued Feb. 15, 1966 to which reference may be made for a disclosure of machine structure and operation. Such a machine may include a tool carrier or cradle 2 upon which a suitable cutting tool or tools are supported for cutting motion, the cradle being rotatable about axis 3 on the machine frame, not shown. The machine may further include a work spindle 5, for supporting a gear or similar workpiece, the spindle being mounted for rotation about axis 6 in a spindle support, not shown, that is adjustable on the frame and also movable thereon for work infeed and withdrawal. The illustrated drive means are arranged to rotate the cradle and the work spindle back and forth about their respective axes in constant velocity ratio and to accommodate adjustment and infeed and withdrawal motions of the spindle support on the frame.

The drive comprises a shaft 7 driven by a motor, not shown, through suitable reduction gearing. The shaft has secured thereon a cam 8 for actuating the generating train of the machine, a cam 9 for actuating a hydraulic reversing valve 11 which controls the work indexing mechanism, and a feed cam 13 which, preceding each indexing operation, effects withdrawal of the work spindle support from the cutting tools. Cam 8 oscillates a lever 14 which is fulcrumed at 15 to the frame and acts through pivotally connected slide blocks 16 to oscillate a slide 17 on the frame. One of the blocks 16 is slidable in a transverse guide groove 18 in slide 17, and the other block 16 is adjustable in lever 14, radially of fulcrum 15, to adjust the stroke of the slide. Flexible steel bands 19 connect the slide 17 to an arcuate segment 21 adjustably secured to the cradle 2, so that the latter is rotated back and forth about its axis 3 upon reciprocation of the slide.

The generating train, which connects cradle 2 to work spindle 5, includes the segment 21, bands 19 and slide 17, and further comprises a lever 22, a slide 23 on the frame having rigid therewith a ball-nut 24, a screw 25 threaded to the ball-nut, ratio-of-roll change gears 26, shaft 27, gears 28 and 29, differential gears 31, 32 and 33, bevel gears 34 and 35, splined shaft 36, bevel gears 37, shaft 38, bevel gears 9, splined shaft 41, bevel gears 42, worm 43 and worm wheel 44 on spindle 5. The ball-nut and screw 24, 25, convert the reciprocating motion of slide 23 into reversing rotation of screw 25, this screw being rotatable but axially immovable in the frame. Lever 22 is fulcrummed on the frame at 45, pivotally supports a block 46 that is slidable in a transverse groove in slide 23, and also pivotally supports blocks 47. One of the latter is slidable in a transverse groove in slide 17 and the other is adjustable along the lever, radially of fulcrum 45. By this adjustment, which varies the stroke of slide 23 relative to that of slide 17, fine changes may be made in the ratio-of-roll between cradle 2 and spindle 5, so that only a few pairs of change gears 26 are required, for coarse changes in the ratio-of-roll.

Figure 2:
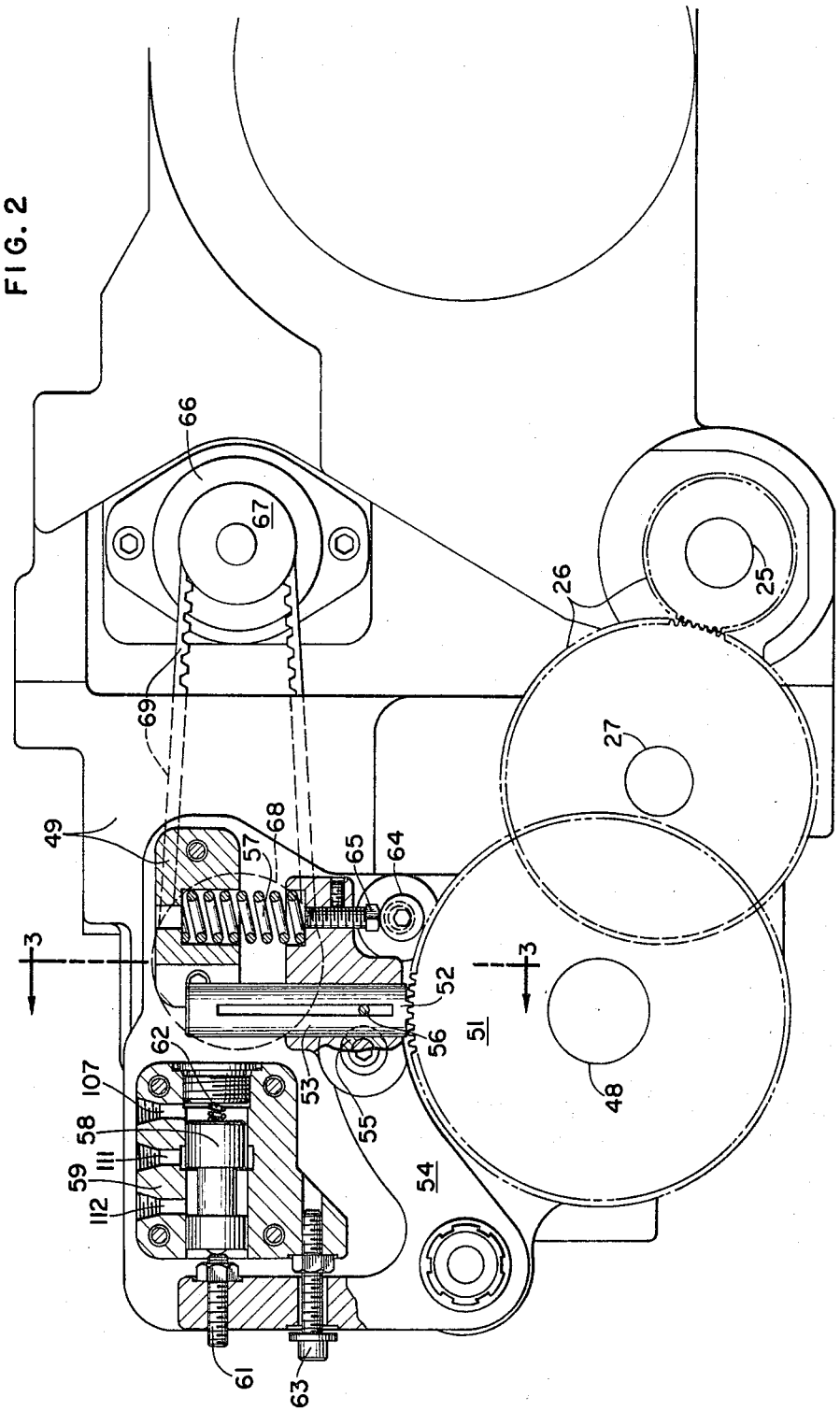
FIG. 2 is an end view of the index mechanism, with parts in section, approximately in the plane designated 2—2 in FIG. 1.

Gears 29 and 31 are co-rotatable on a shaft 48, as are also the gears 33 and 34, the shaft being rotatable in an index bracket 49 rigid with the machine frame. The shaft has rigid therewith a transverse stub shaft on which differential planet gear 32 is rotatable. To one end of the shaft 48 an index plate 51 is detachably secured, the plate having equally spaced about its periphery a number of notches or other index formations engageable by a pawl 52. Preferably, as shown in FIG. 2, the plate is a spur gear with whose teeth the pawl is engageable. By intermittent disengagement of the pawl and angular advance of the shaft 48 and index plate 51, rotation is added by the differential 31-33 to the generating train to index the work spindle 5, usually by one pitch of a work gear mounted on the spindle.

Referring to FIG. 2, the pawl 52 has a cylindrical shank 53 held in a bore in a bell-crank pawl lever 54 by a screw-operated clamp 55. Upon release of the clamp the pawl may be adjusted on the lever in a direction radial of shaft 48, to accommodate index plates 51 of different diameters (and correspondingly different numbers of teeth). A pin 56, held by the lever and extending through a longitudinal slot in the pawl shank, holds the pawl against rotation. A spring 57 urges the lever 54 clockwise to engage the pawl. Disengagement is effected by hydraulic pressure applied to a piston-valve 58 that is slidable in a cylinder 59 on the bracket 49. The piston-valve abuts a screw 61 threaded to the lever, being held thereagainst by a spring 62. Another screw, 63, adjustably secured to cylinder 59, limits the counter-clockwise, pawl-disengaging, motion of the lever. For the purpose of lifting the pawl against the resistance of spring 57, to enable exchange of index plates 51, an eccentric 64 engages the head of a screw 65 that is secured to the lever 54. The eccentric is manually rotatable in the bracket 49 by means of a suitable wrench.

Figure 3:
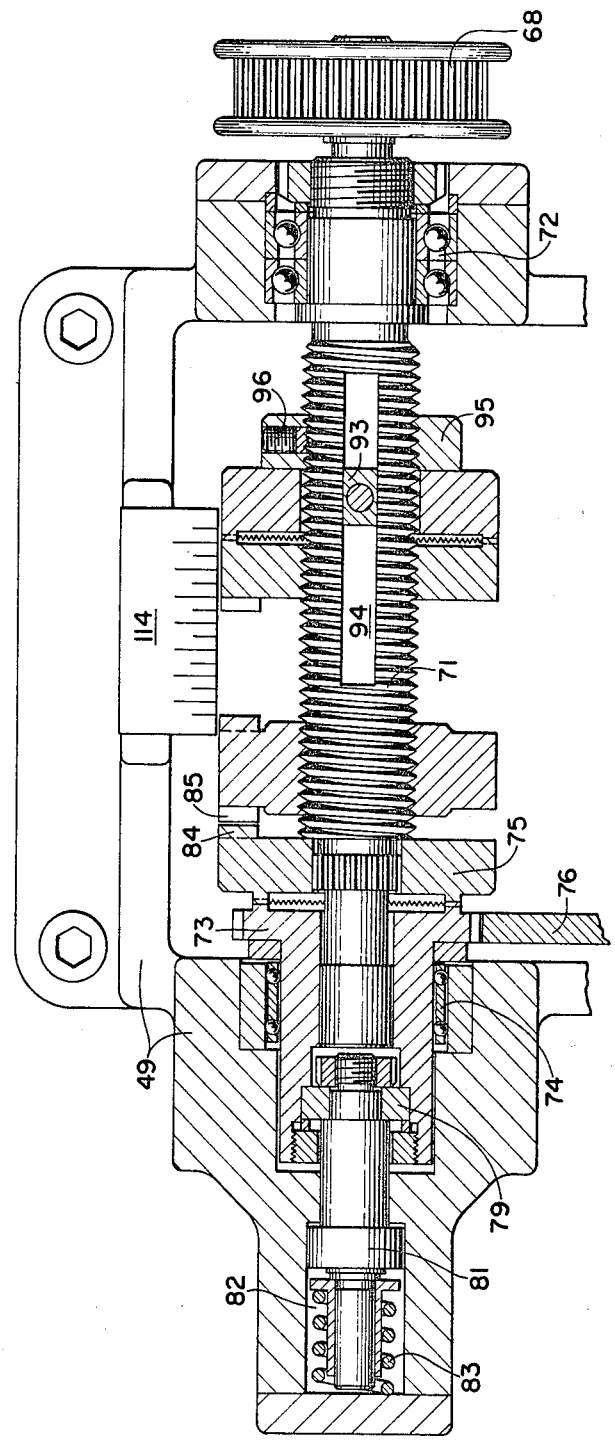
FIG. 3 is a sectional view of another portion of the index mechanism, approximately in plane 3—3 of FIGS. 1 and 2.

Shaft 43 is intermittently rotated by an hydraulic motor 66 of the reversible, positive displacement type, which is mounted on bracket 49 and through cog pulleys 67 and endless cog belt 69, drives an index control screw 71. This screw is journaled for rotation in the bracket 49 on radial and axial thrust anti-friction bearings 72, FIG. 3, and also is journaled in the hub of a fine-pitch face coupling and gear member 73. The latter is journaled for rotation and axial motion in the bracket on a ball-sleeve bearing 74 and has face coupling teeth which mesh with like teeth of a face coupling member 75 rigidly secured to screw 71. The gear teeth of the member 73 mesh with a gear 76 that is integral with a pinion 77 and is mounted for rotation in the bracket, the pinion meshing with a gear 78 affixed to shaft 48. Member 73 is connected by an axial thrust roller bearing 79 to a piston 81 that is reciprocable in cylinder 82. A spring 83 acts against the piston to maintain the clutch teeth of member 73 engaged with those of clutch member 75 in the absence of pressure in the right end of the cylinder (in FIGS. 1 and 3).

A lug 84 on clutch member 75, FIG. 4, is engageable with a similar lug 85 on a traveler nut 86 that is threaded onto screw 71 and has a keyway slidably engaged with a key 87 on the bracket 49. Another lug 88 on nut 86 is engageable with a lug 89 on a fine-tooth face clutch member 91 threaded onto screw 71. A clutch member 92 mating with member 91 is secured, by key 93 in a way 94 along the screw 71, for slidable, non-rotatable, adjustment lengthwise of the screw. A clamp-nut 95, to draw clutch members 91 and 92 together, is threaded onto screw 71 and is secured to the latter by a set-screw 96. Traveler nut 86 carries two pins 97 which straddle the stem of a valve 98 that is slidable in the bore of a valve body 99 secured to bracket 49, and, as the nut approaches its left limit position, abut a collar 100 on the valve stem to close the valve by moving it to the left, against the resistance of a spring 101 which presses it to the right, toward open position. Referring to FIG. 1, other elements of the hydraulic system of the mechanism comprise a check valve 102 and flow restrictors 103 and 104.

In operation, once during each tooth cutting cycle of the machine, i.e. once during each revolution of cam shaft 7, a lobe of cam 9 operates valve 11 to indexing position wherein it connects an hydraulic pressure line 105 to a line 106 leading (a) to port 107 of pawl actuator cylinder 59 to disengage pawl 52 from index plate 51, and (b) to motor 66. Simultaneously the valve opens exhaust line 108 to line 109 which is connected (a) through check valve 102 with clutch cylinder 82 so that spring 83 immediately engages clutch 73, 75; (b) through check valve 102 and restrictor 103 to motor 66; and (c) through check valve and valve body 99 to the motor. The motor therefore rotates screw 71 rapidly in a direction to move the nut 86 to the left (the nut being in its right limit position at the start of indexing), and through now-engaged clutch 73, 75 and gearings 73, 76, 77, 78 rotates shaft 48 to index the work spindle 5. As the nut 86 approaches its limit position to the left, pins 97 abut collar 100 and close valve 98, causing the motor to slow by reason of its exhaust being limited to flow through restrictor 103. The indexing action ceases when nut 86 has moved far enough to the left that lug 84 of the now slowly rotating member 84 abuts lug 85 on the nut, and stalls the motor.

When the lobe of cam 9 moves past the valve 11 the latter reverses to its index reset position, wherein it connects lines 106 and 109 respectively to exhaust line 108 and pressure line 105. Spring 57 immediately engages pawl 52 with index plate 51, and, toward the conclusion of this very rapid action, piston 58 uncovers port 111 of piston-valve cylinder 59, applying fluid under pressure from line 109 and port 112 through line 113 to the motor 66 at a rate controlled by restrictor 104, and also applying pressure to cylinder 82, to release clutch 73, 75. The arrangement of piston 58 and port 111 constitutes an hydraulic interlock which prevents release of clutch 73, 75 until the pawl 52 is engaged. Upon such release, the motor operates in the reverse direction to drive traveling nut 86 to the right until it is stalled by the abutment of lug 88 by the lug 89 of rotating clutch member 91, which completes the indexing cycle.

The angular position of the work spindle 5 at the conclusion of each indexing action is controlled by entry of the pawl 52 into a notch or tooth space of the index plate 51. During such entry the pawl may cam the plate in one direction or the other, so that the accuracy of indexing depends upon the plate rather than upon the accuracy of the angle through which traveling nut 86 allows the screw 71 to turn. However the number of notch pitches through which the index plate is advanced during each cycle depends upon the adjustment of clutch member 91 on the screw. Upon loosening of clamp nut 95 and release of clutch member 92 from member 91, the latter may be turned on the screw 71 through any whole and/or fractional number of turns, such adjustment being facilitated by a scale 114 on bracket 49 and degree markings 115 around member 91.

With such adjustment a single index plate may suffice for indexing the work spindle through any of a large number of different angles. For example, in a typical machine, where the turning ratio of screw 71 and shaft 48 is 4:1, and that of shaft 48 and spindle 5 (through differential gears 31–32) is 24:1, an index plate 51 having 75 notches is suitable for the tooth-to-tooth indexing of a work gear on spindle 5 having a tooth number of 9, 10, 15, 18, 20, 25, 30, 36, 40, 45, 50, 60, 72, 75, 90, 100 or 120. For a work gear of 9 teeth the clutch 91 is adjusted to permit 10⅔ turns of screw 71 (2⅔ turns of plate 51) whereas for 75 teeth it is adjusted to allow 1²¹⁄₇₅ turns of the screw and for 120 teeth only ⅘ of a turn. Work gears of all tooth numbers from 9 to 60 and all except prime numbers from 60 to 120, can be accommodated by only seventeen interchangeable index plates, with notch numbers of 53, 55, 57, 58, 59, 62, 68, 69, 70, 74, 75, 82, 86, 91, 94, 98 and 99.

Having now described the preferred embodiment of my invention, and its mode of operation, what I claim is:

1. A gear generating machine comprising a rotatable work spindle, a movable tool carrier and a reversing rotary generating train connecting the spindle and carrier, said train including reduction gearing through which the train drives the spindle and also including a differential gear set in the train between the carrier and said reduction gearing for intermittently adding rotation to the train for indexing the spindle, an index plate for determining the magnitude of such added motion and being connected to the drive train by said differential gear set, said plate having a plurality of index formations equally spaced therearound, a locating pawl engageable with said formations to fine index and hold the plate against rotation, reversing drive means arranged to rotate the plate in one direction and to have return motion free of the plate, said drive means including means for adjusting the magnitude of each such motion of the index plate through a range of a fraction of one turn to a plurality of turns, and actuating means for said pawl coordinated with said drive means to cause the pawl to engage the plate at the conclusion of each period of rotation of the plate and to disengage the plate prior to each such period of rotation.

2. An index mechanism comprising a rotatable index plate having a plurality of index formations equally spaced therearound, a locating pawl engageable with said formations to fine index and hold the plate against rotation, reversing drive means arranged to rotate the plate in one direction and to have return motion free of the plate, said drive means including means for adjusting the magnitude of each such motion of the index plate through a range of a fraction of one turn to a plurality of turns, and actuating means for said pawl coordinated with said drive means to cause the pawl to engage the plate at the conclusion of each period of rotation of the plate and to disengage the plate prior to each such period of rotation.

3. A mechanism according to claim 2 in which said drive means comprise a reversing motor and a clutch connecting said motor to the index plate, said clutch being arranged to transmit rotary motion from the motor to the plate in one direction only.

4. A mechanism according to claim 3 in which said clutch has an hydraulic actuator and said motor is hydraulically operated, and there are valve means for reversing said motor and concomitantly operating said clutch actuator.

5. A mechanism according to claim 4 in which the actuating means for the pawl comprises an hydraulic actuator controlled by said valve means.

6. A mechanism according to claim 5 in which there is an hydraulic interlock between the clutch and pawl actuators to cause engagement of the pawl to precede release of the clutch.

7. A mechanism according to claim 3 in which there is a screw driven by said motor in both directions, a nut threaded to the screw and supported non-rotatably for travel along the screw, and abutments on the screw and nut for limiting rotation of the screw in each direction, the abutment on the screw for limiting rotation in one direction being threaded to the screw for adjustment thereon to thereby adjust the angle through which the screw may rotate.

8. A mechanism according to claim 2 in combination with a machine having an indexible element, and reduction gearing connecting said index plate with said element, to cause said plate to turn through a number of complete revolutions for each complete turn of said element.

No references cited.

WILLIAM W. DYER, Jr., *Primary Examiner.*

GERALD A. DOST, *Assistant Examiner.*